United States Patent
Sato et al.

(10) Patent No.: US 7,820,213 B2
(45) Date of Patent: Oct. 26, 2010

(54) CHEWING GUM BASE COMPOSITION

(75) Inventors: Yoshinori Sato, Niiza (JP); Yoshiyuki Nagaoka, Nishinomiya (JP)

(73) Assignee: Nagaoka & Co., Ltd. (JP)

( * ) Notice: Subject to any disclaimer, the term of this patent is extended or adjusted under 35 U.S.C. 154(b) by 1331 days.

(21) Appl. No.: 10/521,925

(22) PCT Filed: Jul. 22, 2003

(86) PCT No.: PCT/IB03/03889

§ 371 (c)(1), (2), (4) Date: Aug. 16, 2005

(87) PCT Pub. No.: WO2004/034804

PCT Pub. Date: Apr. 29, 2004

(65) Prior Publication Data

US 2006/0141094 A1    Jun. 29, 2006

(30) Foreign Application Priority Data

Jul. 24, 2002   (JP) .............................. 2002-215615

(51) Int. Cl.
*A23G 4/00*   (2006.01)
(52) U.S. Cl. .......................... 426/3; 426/4; 426/5; 426/6
(58) Field of Classification Search ..................... 426/3, 426/4, 5, 6
See application file for complete search history.

(56) References Cited

U.S. PATENT DOCUMENTS 6,013,287 A * 1/2000 Bunczek et al. ................. 426/6

2004/0247669 A1 * 12/2004 Gin et al. ..................... 424/468

FOREIGN PATENT DOCUMENTS

| EP | 0 066 864 A2 | 12/1982 |
| EP | 0 711 506 A2 | 5/1996 |
| JP | 58009655 | 1/1983 |
| JP | 6-141792 | 5/1994 |
| JP | 7-506962 | 8/1995 |
| JP | 10-512747 | 12/1998 |
| WO | WO 94/14424 | 7/1994 |
| WO | WO 95/09601 | 4/1995 |
| WO | WO 96/11582 | 4/1996 |
| WO | WO 96/20609 | 7/1996 |

OTHER PUBLICATIONS

Li et al., WO 200019837, Biodegradable Chewing Gum Bases Including Plasticized Poly (D,L-Lactic Acid) and Copolymers Thereof, Apr. 13, 2000.*
Office Action issued in corresponding Japanese Patent Application No. 2004-544522 dated May 20, 2009 (including English translation).

* cited by examiner

*Primary Examiner*—Keith D Hendricks
*Assistant Examiner*—Elizabeth Gwartney
(74) *Attorney, Agent, or Firm*—Knobbe, Martens, Olson & Bear, LLP

(57) ABSTRACT

The invention provide a gum base composition which has an excellent chewing texture and is disintegratable and biodegradable comprising biodegradable ingredients, including a lactic acid polymer comprising a poly-L-lactic acid polymer and/or other lactic acid polymers having a glass transition temperature higher than 50° C. in an amount of from 5% by weight to 60% by weight, and an emulsifying plasticizer in an amount of from 1% by weight to 20% by weight. The weight average molecular weight of the lactic acid polymer to be used is preferably 50,000 to 200,000.

10 Claims, No Drawings

CHEWING GUM BASE COMPOSITION

This application is the U.S. National Phase under 35 U.S.C. §371 of International Application PCT/IB2003/003889, filed Jul. 22, 2003, which claims priority to Japanese Patent Application No. 2002-215615, filed Jul. 24, 2002. The International Application was not published under PCT Article 21(2) in English.

FIELD OF THE INVENTION

The present invention relates to gum base compositions comprising a biodegradable component. More specifically, the present invention relates to gum base compositions containing polylactic acid in the biodegradable component.

BACKGROUND TECHNOLOGY

Chewing gum typically comprises two major portions, namely a chewable portion such as a gum base and a non-chewable portion including sweetening agents, softening agents, flavoring agents, and the like. The gum base is a masticatory substance, which is insoluble in the saliva, comprising a blend of natural and/or synthetic rubbers, natural and/or synthetic resins, fillers, plasticizers, emulsifiers, waxes, and the like. On the other hand, the non-chewable portion includes substances which are readily soluble and mostly dissolve out into the mouth upon chewing.

Since the gum base is not dissolved by saliva, it remains as it is for a long period of time when chewing gum is discarded in an environment such as on the street after being chewed, thus causing a pollution problem. A method of replacing ingredients in the gum base with disintegratable or biodegradable ingredients has been proposed as one way to reduce such an impact of chewing gum onto the environment.

Japanese Patent Application Laid-open No. H6-7090 suggests that a gum base which is susceptible to biodegradation can be obtained by replacing a paraffin component, which is used as a wax in a gum base, with a triglyceride composition having a specific fatty acid composition. However, this gum base cannot provide a fundamental solution to the pollution problem since it also contains non-degradable components other than the wax, in particular synthetic elastomers, which remain in the environment.

In imparting disintegratability and biodegradability to a gumbase, there rises a problem that non-degradable synthetic rubbers and resins, in particular butyl rubber and polyvinyl acetate are used. They are used as a major component of the gum base because of their durability and convenience. This problem has been solved by using a natural rubber in place of butyl rubber; however, replacement of polyvinyl acetate is not easy in terms of texture and processibility. Accordingly, in order to impart disintegratability and biodegradability to a gum base, there is a need for a material which has a function comparable to that of polyvinyl acetate and at the same time is disintegratable or biodegradable.

Japanese Patent Application Laid-open No. H8-196214 discloses that a biodegradable chewing gum can be obtained by using a biodegradable polymer comprising polyesters or polycarbonates in a gum base. In this way, biodegradability can be imparted to the entire gum base. However, since the glass transition temperature of this gum base is at the highest 37° C., a gum base with a soft chewing texture only can be obtained.

Further, Japanese Patent Application Laid-open No. H10-262566 discloses a biodegradable chewing gum, in which a faction mainly comprising glutenin fractionated from wheat gluten is heat-treated and blended. However, the amount of said treated glutenin to be added is limited to less than 8% since its addition creates insufficient chewing texture; thus it is impossible to entirely replace other non-biodegradable gum base ingredients.

On the other hand, International Publication No. WO 00/19837 discloses a technology to apply a lactic acid polymer to a gum base as a biodegradable polymer. In this publication, in order to obtain soft chewing texture, D-lactic acid monomers are further added to apoly (D-, L-lactic acid) polymer and their co-polymer with glycolic acid to reduce a crystallinity and to lower a glass transition temperature and then a plasticizer such as triacetin is further added for further softening. However, since the glass transition temperature of the polymer itself is lowered, the chewing texture deteriorates when being chewed for a long time, and processibility is reduced. Further, sufficient disintegratability may not be obtained since the crystallinity is reduced.

DISCLOSURE OF THE INVENTION

The present invention has been made in view of the above-mentioned problems, and an object of the present invention is to provide a gum base composition which has an excellent chewing texture and flavor lasting qualities and is excellent in disintegratability and biodegradability.

According to an embodiment of the present invention, there is provided a gum base composition comprising biodegradable ingredients, wherein said biodegradable ingredients include a lactic acid polymer comprising a poly-L-lactic acid polymer and/or other lactic acid polymers having a glass transition temperature of higher than 50° C. in an amount of from 5% by weight to 60% by weight (preferably from 10% by weight to less than 50% by weight, more preferably from 20% by weight to 40% by weight), and an emulsifying plasticizer in an amount of from 1% by weight to 20% by weight (preferably from 4 to 19% by weight). The lactic acid polymer comprising a poly-L-lactic acid polymer and/or other lactic acid polymers having a glass transition temperature of higher than 50° C. has a high glass transition temperature and good processibility and is excellent in disintegratability because of its relatively high crystallinity. However, chewing texture tends to become hard because of its high glass transition temperature. The lactic acid polymer can be effectively softened by combining it with an emulsifying plasticizer.

Further, according to another embodiment of the present invention, the above mentioned poly-L-lactic acid polymer has a weight average molecular weight of 20,000 to 1,000,000 (preferably 50,000 to 200,000, more preferably 100,000 to 150,000), a glass transition temperature of higher than 50° C. (preferably 55° C. to 80° C., more preferably 60° C. to 70° C.), and a crystallinity of 20% or less (preferably 10% or less). Further, the softening temperature (primary transition temperature) of the poly-L-lactic acid polymer is higher than the abovementioned glass transition temperature (secondary transition temperature), and, for example, 55° C. to 100° C., preferably about 60° C. to 90° C. In an embodiment, a poly-L-lactic acid polymer having a glass transition temperature of 50° C. to 58° C. has a softening temperature of 60° C. to 90° C. Lactic acid polymers, other than a poly-L-lactic acid polymer, having a glass transition temperature of higher than 50° C. also have properties equivalent to those of the abovementioned poly-L-lactic acid polymer. Examples of such lactic acid polymers include co-polymers of L-lactic acid and D-lactic acid and co-polymers with other monomers; however, the content of monomers other than L-lactic acid is preferably 5% or less.

The abovementioned lactic acid polymer is virtually a poly-L-lactic acid polymer in an embodiment, and further it does not include any lactic acid polymers other than the poly-L-lactic acid polymer in another embodiment. Further, according to another embodiment, in addition to a lactic acid polymers comprising a poly-L-lactic acid polymer and/or other lactic acid polymers having a glass transition temperature of higher than 50° C., a poly(D, L-lactic acid) polymer can be used in an amount not exceeding that of the abovementioned lactic acid polymer, or a co-polymer of D, L-lactic acid with glycolic acid can be used in an amount not exceeding that of the lactic acid polymer.

Furthermore, said gum base composition contains an emulsifying plasticizer. Any plasticizer having an emulsifying activity (surfactant activity) can be appropriately used as said emulsifying plasticizer. For example, acetylated monoglycerides are preferable; however, triacetin, polyglycerols and the like can also be used, and further, these compounds in combination with an emulsifier, such as fatty acid esters, sorbitan fatty acid esters, lecithin, and glycerin, can be used. A gum base having appropriate chewing texture as well as excellent flavor lasting qualities can be prepared even with the use of lactic acid polymers having a high glass transition temperature by effectively combining a lactic acid polymer with these emulsifying plasticizers or emulsifier/plasticizer mixtures. A combining ratio of the aforementioned lactic acid polymers to emulsifying plasticizers (e.g., acetylated monoglycerides) ranges preferably from 90:10 to 80:20 by weight. The ratio can be increased to about 70:30 depending on the kind of the emulsifying plasticizers used.

A gum base composition of the present invention can contain other ingredients; all ingredients in the composition can be biodegradable.

Next, the present invention also includes a method of producing a gum base composition comprising biodegradable ingredients. An embodiment of said method comprises steps of heat kneading and softening a lactic acid polymer comprising a poly-L-lactic acid polymer and/or other lactic acid polymers having a glass transition temperature of higher than 50° C. in a pressure kneader, and homogenizing the softened lactic acid polymer by adding an emulsifying plasticizer to it. The lactic acid polymer is heat-kneaded and softened in a pressure kneader and then mixed with other materials (e.g., acetylated monoglycerides) for preliminary processing to form a polylactic acid mixture, upon which the degree of polymerization of the polymer decreases. By using such a preliminarily processed product, the polylactic acid is homogeneously dispersed and mixed in the gum base in an open type kneader and thus an appropriate chewing texture can be obtained. In an embodiment, the abovementioned pressure kneader is operated at a temperature of 110 to 140° C., preferably 120 to 130° C. and at a pressure of 1 to 10 kg/cm$^2$, preferably 3 to 6 kg/cm$^2$. In another embodiment, the time for heat kneading in an open type kneader is about 1 to 10 hours, preferably about 2 to 5 hours, and the time for preliminary processing is about 1 to 60 minutes, preferably 5 to 30 minutes. As a result, the glass transition temperature of the gum base composition is decreased to about 40° C. (preferably about room temperature). Further, according to an embodiment, the softening temperature of the gum base composition becomes 50 to 90° C. (about 65 to 75° C. in another embodiment).

Further, since the softening temperature (primary transition temperature) is strongly affected by viscosity, it varies depending on the amount of gums (for controlling the texture) used in a gum base composition. Further, the softening temperature of a gum base composition is different from that of chewing gum itself. Chewing gum consists of a gum base composition, sugars, softening agents (e.g., glycerin, sorbitol), flavors, and the like, and the gum base composition is further plasticized. Since chewing gum is further softened by the chewing and the permeating saliva, its softening temperature is generally adjusted to about body temperature. Further, the glass transition temperature (secondary transition temperature) as used herein means the temperature at which a liquid substance loses its fluidity and becomes an amorphous solid with a decrease in temperature, and the softening temperature (primary transition temperature) means the temperature at which a solid becomes a liquid with an increase in temperature.

BEST MODE OF CARRYING OUT THE INVENTION

A gum base composition of the present invention will be explained as follows. Further, the structures explained hereinafter are not to be construed to limit the scope of the invention and it is to be understood by the skilled in the art that various changes are possible within the sprit of the invention. Further, all the purposes and effectivenesses of the invention described are not necessarily to be displayed and only a part of them may be accomplished in each of the embodiments.

A gum base composition of the present invention is a gum base composition comprising biodegradable ingredients, wherein the biodegradable ingredients include a lactic acid polymer (polylactic acid) comprising a poly-L-lactic acid polymer and/or other lactic acid polymers having a glass transition temperature of higher than 50° C. in an amount of from 5 to 60% by weight (preferably from 10% by weight to less than 50% by weight). Preferably, the polylactic acid is virtually a poly-L-lactic acid (PLLA). In the present specification, biodegradable ingredients refer to ingredients which can be hydrolyzed by physiologically active substances of organisms, in particular microorganisms. Accordingly, a gum base composition of the present invention can comprise a polylactic acid, a biodegradable ingredient, as an essential component, and other ingredients such as biodegradable natural rubbers, resins, fillers, plasticizers and/or emulsifiers, and waxes. A gum base composition of the present invention will be explained in detail as follows.

(A) Polylactic Acid

Polylactic acid is an aliphatic polyester in which lactic acid is polymerized, which can be degraded into carbon dioxide and water in an environment by microorganisms and thus have attracted an attention as a plastic that creates a little stress on an environment and can be reused as a resource. Polylactic acid is expected to be useful in films, sheets for vacuum injection molding and foam sheets, paper coating process, fibers, and the like (Shimadzu Hyoron, Vo. 53, No. 1, 1996.6).

Polylactic acid can be obtained, for example, by making L-lactic acid into lactide, a cyclic dimer, and then subjecting it to ring-opening polymerization, or by dehydrating L-lactic acid in an organic solvent.

The weight average molecular weight of a polylactic acid used in a gum base composition of the present invention is 20,000 to 1,000,000, preferably 50,000 to 200,000. Its elasticity may be lost when the weight average molecular weight is smaller than 50,000, whereas its elasticity may be too strong when the weight average molecular weight exceeds 200,000. Further, the weight average molecular weight is preferably 100,000 to 150,000. The weight average molecular weight of the polylactic acid can be controlled, for example, by the concentration of an alcohol-type polymerization initiator.

Further, in view of an appropriate chewing texture, the glass transition temperature of the abovementioned polylactic acid is preferably 55 to 80° C., more preferably 60 to 70° C., exceeding 55° C. Polylactic acid is glass-like at room temperature and high in strength and transparency; for example, poly L-lactic acid (PLLA) has the following characteristics (PLLA according to an embodiment has these values within the range of ±10%).

|  | Glass transition temperature (° C.) | Melting point (° C.) | Tensile strength (MPa) | Elongation at break (%) |
| --- | --- | --- | --- | --- |
| PLLA | 58 | 175 | 65 | 3.0 |

Since polylactic acid has a glass transition temperature of higher than 50° C. (preferably 55 to 80° C.), it is fragile and poor in processibility at room temperature; however, according to the present invention, said glass transition temperature can be lowered to a normal temperature (or lower than that) by softening using an emulsifying plasticizer. Further, the softening temperature of the gum base composition depends on its viscosity and varies depending on the amount of gums used; for example, the glass transition temperature of a natural rubber is −73° C., the glass transition temperature of polyisobutylene is −74° C., both being below 0° C., which can thus lower the glass transition temperature of the gum base composition.

A gum base composition of the present invention contains a polylactic acid in an amount of from 5% by weight to 60% by weight, preferably from 10% by weight to less than 50% by weight, in a biodegradable component which composes said composition. When the polylactic acid content is less then 10% by weight, the biodegradability may markedly decrease. Further, when the polylactic acid content is 50% or more by weight, the chewing texture may become deteriorated and at the same time the amount of ingredients necessary for lasting flavor may not be enough, which makes it difficult to maintain a quality as chewing gum. The content is more preferably 20 to 40% by weight.

A gum base composition of the present invention contains ingredients such as natural rubbers, resins, fillers, plasticizers and/or emulsifiers, and waxes preferably in an amount of 50% or more by weight; these ingredients are all biodegradable. Chewing gum made using this composition is disintegrated in the environment and biologically degraded, and thus the environmental problem can be solved and at the same time an appropriate chewing texture and long-lasting flavor can be imparted. Further, workability upon processing the gumbase composition into a chewing gum can be improved. The disintegration of chewing gum here is caused by hydrolysis, photolysis, and the like in the environment, which has an effect to accelerate degradation by microorganisms. These ingredients can be appropriately selected according to the characteristics of the gum base composition.

(B) Natural Rubbers

Natural rubbers are prepared by cutting into the bark of trees, such as *Hevea Braziliensis*, gutta-percha, and balata, to draw off milky-white sap and coagulating fine particles of rubber hydrocarbons contained in the resulting sap with acid; the rubbers contain rubber hydrocarbons at about more than 60% by weight. Natural rubbers derived from *Hevea Braziliensis* contain cis-type rubber hydrocarbons and natural rubbers derived from gutta-percha and balata contain trans-type rubber hydrocarbons. These natural rubbers can be used singly or in combination of two or more.

The weight average molecular weight of natural rubbers is preferably 200,000 to 400,000, more preferably 250,000 to 350,000. Thus, a gum base composition can have an appropriate elasticity. The natural rubbers are contained in a gumbase composition preferably at 5 to 20% by weight, more preferably at 5 to 15% by weight.

(C) Resins

Examples of resins include natural resins and ester gums. Natural resins contain rubber hydrocarbons at about 4 to 24% by weight, have a weight average molecular weight of about 7,000 to 250,000, examples of which include chicle, Jelutong, and Sorba. These natural resins are each composed of different components and thus have characteristic chewing texture and flavor. These natural resins can be used singly or in combination of two or more. The natural resins are contained in a gum base composition preferably at 10 to 40% by weight, more preferably at 10 to 30% by weight.

Ester gums are ester compounds of rosin or its derivatives such as polymers and can be added to chewing gum so as to provide a texture that resembles that of a natural resin (chicle) or to improve a chewing texture of chewing gum. Examples of the ester gums include purified rosin esters, hydrogenated rosin esters, disproportionate rosin esters, and polymerized rosin esters. These ester gums are each composed of different components, thereby providing characteristic chewing textures and further affecting the impression of flavor upon chewing the resulting chewing gum. These ester gums can be used singly or in combination of two or more. The ester gums are contained in a gum base composition preferably at 5 to 25% by weight, more preferably at 5 to 20% by weight.

(D) Fillers, Plasticizers and/or Emulsifiers, Waxes and Others

Examples of fillers include calcium carbonate, calcium phosphate, and talc. Calcium carbonate and calcium phosphate are used for a gum without an acidifying agent, and talc is used for a gum with an acidifying agent. Fillers are contained in a gum base composition preferably at 10 to 15% by weight.

As plasticizers, emulsifying plasticizers, acetylated monoglycerides, are preferable; however, a combination of plasticizers, such as triacetin and polyglycerols, and emulsifiers, such as glycerin fatty acid esters, sorbitan fatty acid esters and lecithin, can also be used. These plasticizers or emulsifiers can be used singly or in combination of two or more, depending on their types. The plasticizers and/or emulsifiers are contained in a gum base composition at 1 to 20% by weight, preferably at 4 to 19% by weight.

Examples of waxes include microcrystalline wax, rice wax, chandelila wax, and carnauba wax. Microcrystalline wax is preferable because of its wide applicability. Waxes are preferably contained in a gum base composition at 5 to 30% by weight.

A gum base composition of the present invention can further contain chewing bases such as starch derivatives and hydrogenated oils.

A gum base composition of the present invention can be obtained by mixing the abovementioned polylactic acid (A) and at least one of the components in (B) to (D).

When polylactic acid (A) and at least one of the components in (B) to (D) are mixed, the order of the mixing is not critical. It is preferable to prepare a polylactic acid mixture for use by preliminarily mixing polylactic acid (A) and plasticizers and/or emulsifiers in (D) in order to facilitate mixing of polylactic acid (A), natural rubbers (B), and resins (C). The polylactic acid mixture can be obtained, for example, by heat kneading polylactic acid at 120° C. to 130° C. in a pressure kneader and adding wax into the resulting softened polylactic acid. The mixing ratio of polylactic acid (A) to plasticizers and/or emulsifiers in (D) is preferably 90:10 to 80:20 by weight.

Further, it is preferable to prepare a natural rubber mixture for use by preliminarily mixing natural rubbers (B) and waxes in (D) so as to be able to carry out mixing of polylactic acid (A) and at least one of the components in (B) to (D) at a low temperature. The natural rubber mixture has a melting point lower than that of natural rubbers (B), thereby being able to prevent other components from thermal decomposition. The natural rubber mixture can be prepared by kneading natural rubbers (B) in a pressure kneader and then mixing waxes in (D). The mixing ratio of natural rubbers (B) to waxes in (D) is preferably 20:80 to 40:60 by weight (30:70 to 40:60 in an embodiment).

A gumbase composition of the present invention can be obtained, for example, by mixing the abovementioned preliminarily mixed polylactic acid mixture, the abovementioned natural rubber mixture, components in (C), and components in (D), depending on desired chewing texture. More specifically, it is preferable to include polylactic acid, natural rubbers, natural resins, ester gums, acetylated monoglycerides, microcrystalline wax, fatty acid monoglycerides, and calcium carbonate.

A gum base composition of the present invention has processibility and chewing texture comparable to conventional gum bases and is excellent in disintegratability and biodegradability. A desired chewing gum can be obtained by adding commonly used non-chewable ingredients such as sweeteners, softening agents, coloring agents, flavors, and acidifiers to a gum base composition of the present invention. This chewing gum has chewing texture comparative to conventional chewing gums, as well as long lasting flavor.

EXAMPLE

The present invention is further explained by the following examples; it is to be expressly understood, however, that the present invention is not limited by the examples.

Examples 1-3

Poly-L-lactic acid (Mitsui Chemicals) having a weight average molecular weight of 100,000 and a glass transition temperature of 60° C. and an acetylated monoglyceride (Riken Vitamin) were mixed at a ratio of 9:1 by weight at 110 to 120° C. in a pressure kneader and then the admixture was cooled to prepare a solid poly-L-lactic acid mixture (see (1) in Table 1). Separately, natural rubber (a product of Malaysia) and microcrystalline wax (Nippon Seiro Co., Ltd.) were mixed at a ratio of 4:6 by weight in a pressure kneader to prepare a natural rubber mixture (see (2) in Table 1). Next, the poly-L-lactic acid mixture, the natural rubber mixture, and each of the components (3) to (8) shown in Table 1 were mixed at 110 to 120° C. at ratios (by weight) shown in Table 1 using an ordinary kneader to obtain individual gum base compositions.

The gum base compositions thus obtained were extruded using a Kneader-ruder, allowed through in cooling water, and then spread to a final gum thickness of 1 mm using a rolling mill roll. Stability, disintegratability, and biodegradability of the spread gum base compositions were evaluated as follows. The results are shown in Table 2.

The stability of the gum base compositions was evaluated by a weather resistance test. The gum base compositions were stored for 6 months under the conditions equivalent to those of outdoor exposure test and the evaluation was carried out with the gum base compositions after storage according to the following evaluation standard.

| (Evaluation standard) | |
| --- | --- |
| No change in appearance | ○ |
| Partially disintegrated or degraded | x |

The disintegratability of the gum base compositions was evaluated by a hydrolysis test. The gum base compositions were stored for 6 months in water at 60° C. and the evaluation was carried out with the gum base compositions after storage according to the following evaluation standard.

| (Evaluation standard) | |
| --- | --- |
| Disintegrated | ○ |
| No change in appearance | x |

The biodegradability of the gumbase compositions was evaluated by an activated sludge-burying test and a soil-burying test. The gum base compositions were stored for 6 months under the following test conditions and the evaluation for each test was carried out with the gum base compositions after storage according to the following evaluation standard.

(Test Conditions)

Activated sludge-buring test: Stored at normal temperature in drain sludge

Soil-burying test: Stored at normal temperature in garden soil

| (Evaluation standard) | |
| --- | --- |
| Disintegrated or degraded | ○○ |
| Partially disintegrated or degraded | ○ |
| No change in appearance | x |

Comparative Examples 1, 2 and 3

Polyvinylacetate (Wacker) and microcrystalline wax were mixed at 110 to 120° C. at a ratio of 9:1 by weight and then the admixture was cooled to prepare a solid polyvinyl acetate mixture (see (1) in Table 1). Separately, butyl rubber (Exxon) and microcrystalline wax (Nippon Seiro Co., Ltd.) were mixed at a ratio of 4:6 by weight in a pressure kneader to prepare a butyl rubber mixture (see (2) in Table 1). Then, in the same manner as described in Examples 1, 2 and 3, gum base compositions were produced by mixing the poly-L-lactic acid mixture, the natural rubber mixture, and each of the components (3) to (8) shown in Table 1 at ratios (by weight) shown in Table 1, and stability, disintegratability, and biodegradability of the gum base compositions were evaluated. The results are also shown in Table 2.

TABLE 1

| Ingredients | Example 1 | Example 2 | Example 3 | Comparative Example 1 | Comparative Example 2 | Comparative Example 3 |
|---|---|---|---|---|---|---|
| (1) Polylactic acid (polyvinyl acetate) mixtures | | | | | | |
| Polylactic acid | 10.8 | 29.7 | 49.5 | — | — | — |
| Polyvinyl acetate | — | — | — | 10.8 | 29.7 | 49.5 |
| Acetylated monoglycerides | 1.2 | 3.3 | 5.5 | 1.2 | 3.3 | 5.5 |
| (2) Natural rubber (butyl rubber) mixtures | | | | | | |
| Natural rubber | 9 | 7 | 5 | — | — | — |
| Butyl rubber | — | — | — | 9 | 7 | 5 |
| Microcrystalline wax | 13.5 | 10.5 | 7.5 | 13.5 | 10.5 | 7.5 |
| (3) Natural resins | 20 | 10 | 0 | 20 | 10 | 0 |
| (4) Ester gums | 15 | 10 | 7 | 15 | 10 | 7 |
| (5) Acetylated monoglycerides | 4 | 8 | 9 | 4 | 8 | 9 |
| (6) Microcrystalline wax | 10 | 8.5 | 4.5 | 10 | 8.5 | 4.5 |
| (7) Fatty acid monoglycerides | 2 | 2 | 2 | 2 | 2 | 2 |
| (8) Calcium carbonate | 14.5 | 11 | 10 | 14.5 | 11 | 10 |
| Total | 100 | 100 | 100 | 100 | 100 | 100 |

The figures are parts by weight.

TABLE 2

| Evaluation | Test | Example 1 | Example 2 | Example 3 | Comparative Example 1 | Comparative Example 2 | Comparative Example 3 |
|---|---|---|---|---|---|---|---|
| Stability | Weather tolerance test | ○ | ○ | ○ | ○ | ○ | ○ |
| Disintegratability | Hydrolysis test | ○ | ○ | ○ | x | x | x |
| Biodegradability | Activated sludge-burying test | ○ | ○○ | ○○ | x | x | x |
| | Soil-burying test | ○ | ○ | ○ | x | x | x |

From the results shown in Table 2, it is revealed that the gum base compositions in Examples have stability equivalent to that of Comparative Examples at normal temperature. Further, it is revealed that the gum base compositions of Comparative Examples are neither disintegrated or degraded whereas the gum base compositions of Examples are disintegrated by hydrolysis and degraded in an environment with abundant microorganisms, such as soil and activated sludge.

Examples 4, 5 and 6

The gum base compositions prepared in Examples 1, 2 and 3 were blended in ratios (by weight) shown in Table 3 to prepare chewing gums using a blender. The resulting chewing gums were taken out of the blender, extruded using an extruder, and rolled and formed into gums having a size of 1.9 mm×19 mm×73 mm using multiple stand mill rolls.

Five expert panelists were required to chew the resulting rolled and formed chewing gums for 5 minutes. Chewing texture and flavor lastingness after chewing for 5 minutes were organoleptically evaluated using a scoring range of 0 to 100. The evaluation method used is an absolute evaluation by individuals, with 100 as the best score. The results are shown in Table 4. The results in Table 4 show the averages of the scores by the five expert panelists (decimal numbers were rounded off).

Comparative Examples 4, 5 and 6

The gum base compositions prepared in Comparative examples 1, 2 and 3 were blended at ratios (by weight) shown in Table 3 to prepare chewing gums using a blender. Then, in the same manner as described in Examples 4, 5 and 6, chewing texture and flavor lastingness of the chewing gums were organoleptically evaluated. The results are also shown in Table 4.

TABLE 3

| | | Examples 4 | 5 | 6 | Comparative Examples 4 | 5 | 6 |
|---|---|---|---|---|---|---|---|
| Gum base compositions used | | 1 | 2 | 3 | 1 | 2 | 3 |
| Blend | Gum base composition | 25 | 25 | 25 | 25 | 25 | 25 |
| | Sugar | 63 | 63 | 63 | 63 | 63 | 63 |
| | Glutinous starch syrup | 10 | 10 | 10 | 10 | 10 | 10 |
| | Glycerin | 1 | 1 | 1 | 1 | 1 | 1 |
| | Flavors | 1 | 1 | 1 | 1 | 1 | 1 |
| Total | | 100 | 100 | 100 | 100 | 100 | 100 |

The figures are parts by weight.

TABLE 4

| | Example 4 | 5 | 6 | Comparative Example 4 | 5 | 6 |
|---|---|---|---|---|---|---|
| Organoleptic evaluation | | | | | | |
| Chewing texture | 94 | 76 | 57 | 95 | 78 | 55 |
| Flavor lastingness | 91 | 76 | 55 | 90 | 77 | 50 |

The figures are averages (decimal numbers are rounded off).

From the results in Table 4, it is revealed that the chewing gums of Examples 4, 5 and 6 have the chewing texture and flavor lastingness equivalent to those of chewing gums of corresponding Comparative Examples 4, 5 and 6.

POSSIBILITY OF INDUSTRIAL USE

Gum base compositions of the present invention have the processibility and a chewing texture equivalent to that of conventional gum base compositions and are excellent in disintegratability and biodegradability. Chewing gums produced using the gumbase compositions of the present invention have a chewing texture equivalent to that of conventional chewing gums, as well as a long-lasting flavor.

The invention claimed is:

1. A gum base composition comprising biodegradable ingredients, wherein said biodegradable ingredients include a lactic acid polymer, which contains no lactic acid polymers other than poly-L-lactic acid polymer having a glass transition temperature of 55° to 80° C., in an amount of from 5% by weight to 50% by weight, and an emulsifying plasticizer in an amount of from 4% by weight to 19% by weight.

2. The gum base composition according to claim 1, wherein the content of said lactic acid polymer is from 10% by weight to less than 50% by weight.

3. The gum base composition according to claim 1 or 2, wherein said lactic acid polymer has a weight average molecular weight of 50,000 to 200,000.

4. The gum base composition according to claim 1, which contains an acetylated monoglyceride as said emulsifying plasticizer.

5. The gum base composition according to claim 4, wherein the ratio by weight of said lactic acid polymer to the acetylated monoglyceride is from 90:10 to 80:20.

6. The gum base composition according to claim 1, wherein the gum base consists of biologically degradable ingredients.

7. A method of producing a gum base composition comprising biodegradable ingredients, which comprises steps of heat kneading and softening a lactic acid polymer having a glass transition temperature of 55° to 80° C., which contains no lactic acid polymers other than poly-L-lactic acid polymer, in a pressure kneader, and homogenizing the resulting softened lactic acid polymer by adding an emulsifying plasticizer to it, said biodegradable ingredients containing lactic acid polymers in an amount of from 5% by weight to less than 50% by weight.

8. The method of producing a gum base composition according to claim 7, wherein the temperature of said pressure kneader is 110° to 120° C.

9. The method of producing a gum base composition according to claim 7, which contains an acetylated monoglyceride as said emulsifying plasticizer.

10. The method of producing a gum base composition according to claim 7, wherein the ratio by weight of said lactic acid polymer to said emulsifying plasticizer is from 90:10 to 80:20.

* * * * *